(12) United States Patent
Ramsay (10) Patent No.: US 8,856,102 B2
(45) Date of Patent: Oct. 7, 2014

(54) MODIFYING STRUCTURED QUERY LANGUAGE STATEMENTS

(71) Applicant: International Business Machines Corporation, Armonk, NY (US)

(72) Inventor: Dexter F. Ramsay, Duncraig (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/671,446

(22) Filed: Nov. 7, 2012

(65) Prior Publication Data

US 2014/0129582 A1 May 8, 2014

(51) Int. Cl.
*G06F 17/30* (2006.01)
(52) U.S. Cl.
USPC .......................... 707/713; 707/716; 707/717
(58) Field of Classification Search
USPC ........................................ 707/713, 716, 717
See application file for complete search history.

(56) References Cited

U.S. PATENT DOCUMENTS

| | | | | |
|---|---|---|---|---|
| 5,870,739 A | * | 2/1999 | Davis et al. .......................... | 1/1 |
| 5,873,079 A | * | 2/1999 | Davis et al. .......................... | 1/1 |
| 5,884,304 A | * | 3/1999 | Davis et al. .......................... | 1/1 |
| 6,165,567 A | * | 12/2000 | Ventzek et al. ............... | 427/576 |
| 6,167,393 A | * | 12/2000 | Davis et al. ............................ | 1/1 |
| 7,533,111 B2 | * | 5/2009 | McCollum ............................ | 1/1 |
| 7,870,398 B2 | * | 1/2011 | Perng et al. .................... | 713/193 |
| 2004/0220896 A1 | * | 11/2004 | Finlay et al. ....................... | 707/1 |
| 2005/0120001 A1 | | 6/2005 | Yagoub et al. ..................... | 707/3 |
| 2007/0162476 A1 | * | 7/2007 | McCollum .................... | 707/101 |
| 2008/0126393 A1 | | 5/2008 | Bossman et al. .............. | 707/102 |
| 2008/0183656 A1 | * | 7/2008 | Perng et al. ....................... | 707/2 |
| 2009/0077016 A1 | * | 3/2009 | Belknap et al. ................... | 707/2 |
| 2011/0208759 A1 | * | 8/2011 | Zellweger ..................... | 707/754 |
| 2012/0191642 A1 | * | 7/2012 | George ........................ | 707/602 |

OTHER PUBLICATIONS

IBM, "SQL Set Construct Enhancement," IP.com, IPCOM000110428D, Mar. 25, 2005, 2 pages.

* cited by examiner

*Primary Examiner* — Baoquoc N To
(74) *Attorney, Agent, or Firm* — VanLeeuwen & VanLeeuwen; John. D. Flynn (57) ABSTRACT

An approach is provided to modifying structured query language (SQL) statements to more efficient forms. In the approach, an SQL statement is received and compared to a number of predefined malformation rules with at least one of the predefined malformation rules includes a syntactical pattern. If the comparison reveals that the received SQL statement includes a malformed expression that would be inefficiently processed by a database engine, the malformed expression is modified to an efficient SQL expression form and the efficient SQL expression form is executed by the database engine.

20 Claims, 6 Drawing Sheets

MODIFYING STRUCTURED QUERY LANGUAGE STATEMENTS

TECHNICAL FIELD

The present disclosure relates to an approach that identifies and modifies malformed structured query language (SQL) statements.

BACKGROUND OF THE INVENTION

Traditional relational database optimizer code performs various functions when it processes a Structured Query Language (SQL) statement. The SQL optimizer uses many statistics that are stored in the relational database catalogue (or dictionary) to select an optimal access path when retrieving data from tables and views. Additionally the SQL optimizer uses rules and heuristics based on relational tuple calculus to make its access path selections. However, despite the tasks performed by the optimizer, a user can still submit valid but "malformed" SQL statements that will be processed unchanged by the optimizer. Processing of malformed statements can be highly inefficient to the database engine. This is especially burdensome when the SQL statements are stored and repeatedly executed.

SUMMARY

An approach is provided to modifying structured query language (SQL) statements to more efficient forms. In the approach, an SQL statement is received and compared to a number of predefined malformation rules with at least one of the predefined malformation rules includes a syntactical pattern. If the comparison reveals that the received SQL statement includes a malformed expression that would be inefficiently processed by a database engine, the malformed expression is modified to an efficient SQL expression form and the efficient SQL expression form is executed by the database engine.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
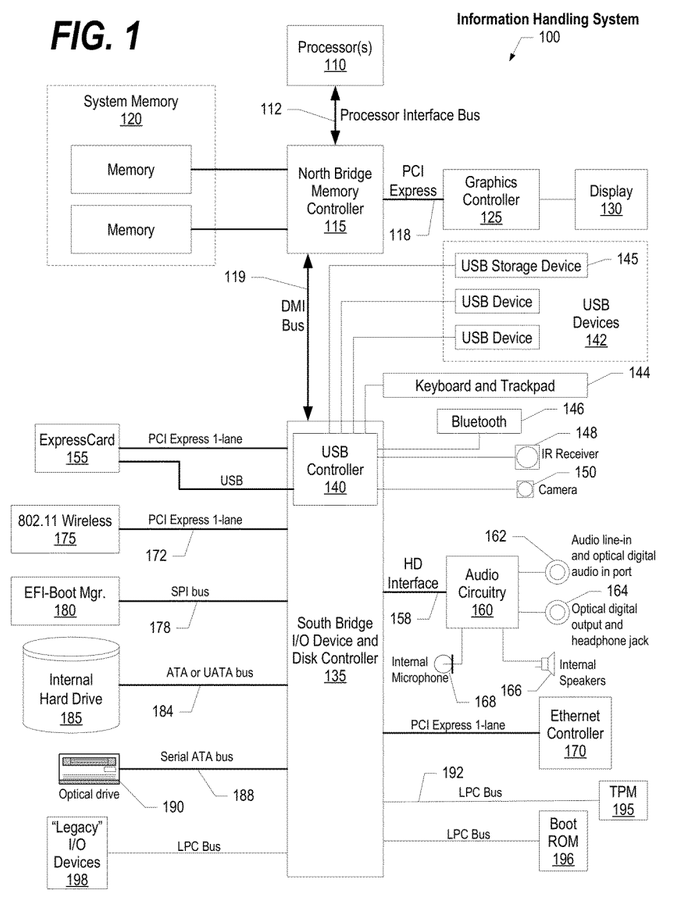
FIG. 1 is a block diagram of a data processing system in which the methods described herein can be implemented.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 0.802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

Figure 2:
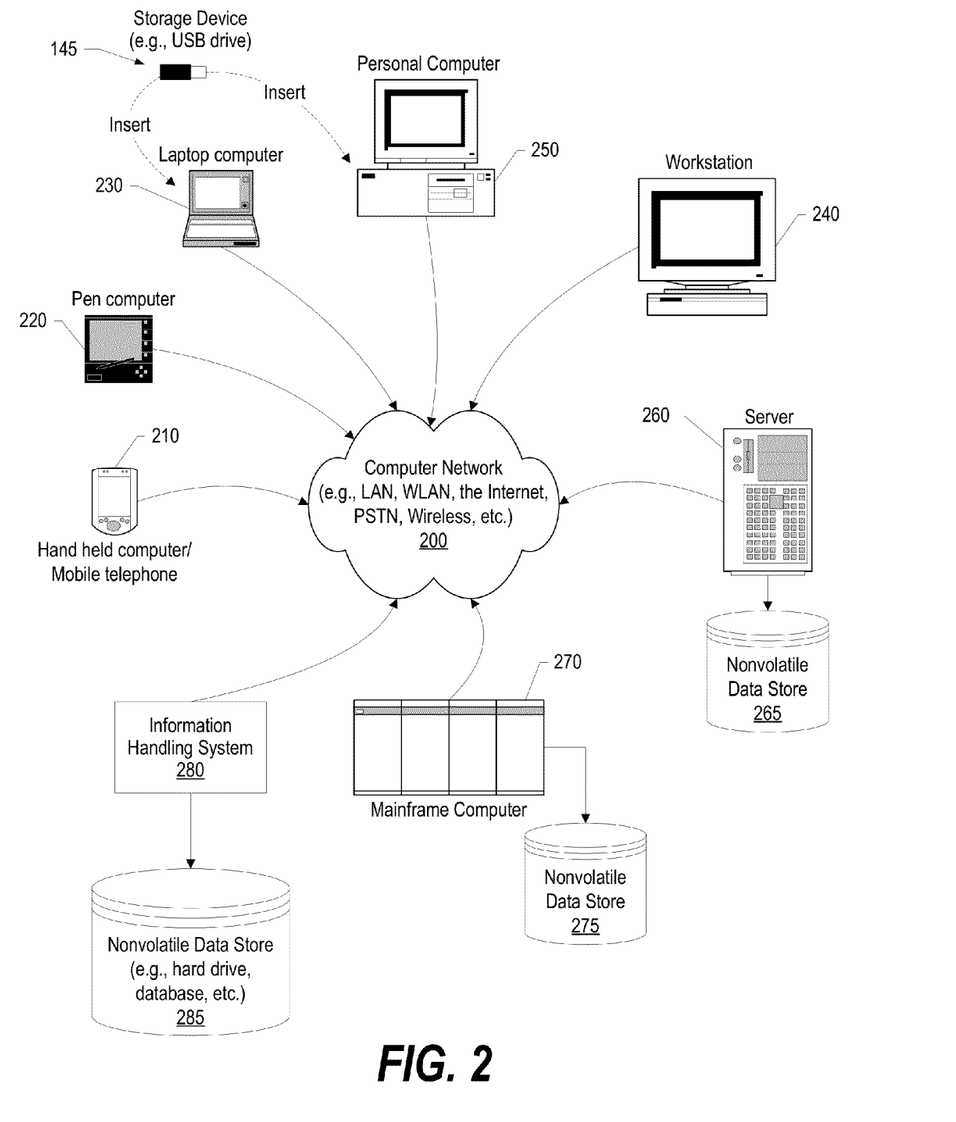
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3-6 depict an approach that can be executed on an information handling system and computer network as shown in FIGS. 1-2. In this approach, malformed structured query language (SQL) statements are identified and modified into efficient SQL expressions that are more efficiently processed by a database engine. In this manner, malformed SQL statements are inhibited from being (inefficiently) processed by the database engine, thus saving computing resources and time.

Figure 3:
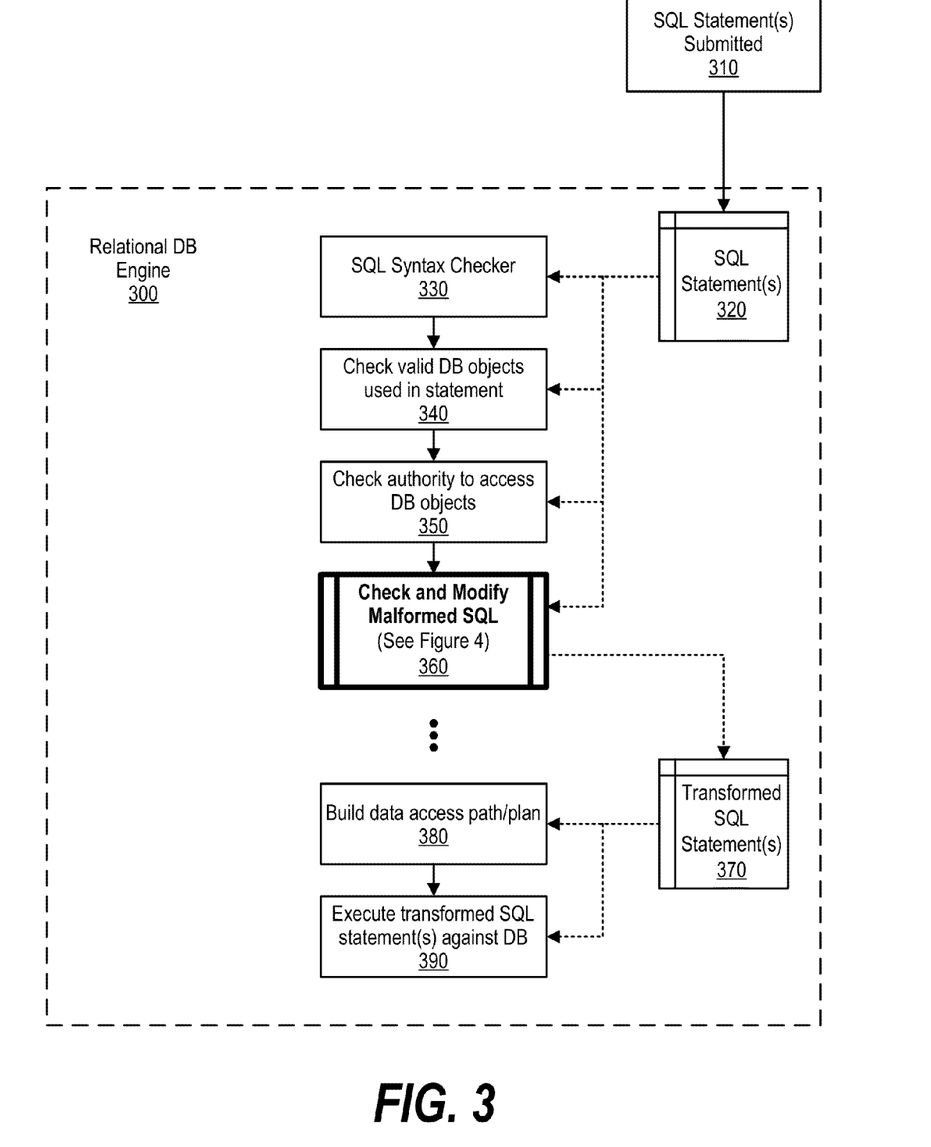
FIG. 3 is a depiction of an improved relational database engine that checks and modifies malformed structured query language (SQL) statements.

FIG. 3 is a depiction of an improved relational database engine that checks and modifies malformed structured query language (SQL) statements. Database engine 300 includes various functions used to process and execute SQL statements 310. A requestor, such as a process or a user, submits SQL statements 310 for processing by the database engine. Database engine 300 stores the received SQL statements in memory area 320. SQL syntax checker 330 is a function that checks whether the SQL statements are syntactically correct, but not whether the statements are malformed. If proper SQL syntax is not used in the submitted SQL statement, function 330 returns an error to the requestor. In function 340, the database optimizer determines whether the objects (e.g., tables, columns, etc.) specified in the received SQL statement are valid database objects. If an invalid object is referenced in the SQL statement (e.g., a table name is misspelled, a column name does not exist, etc.), then function 340 returns an error to the requestor. In function 350, the database optimizer checks the authority needed to access the database objects referenced in the received SQL statement to determine whether the requestor has an appropriate level of authorization. If the requestor does not have proper authorization to access one or more of the referenced database objects, then function 350 returns an error to the requestor.

Figure 4:
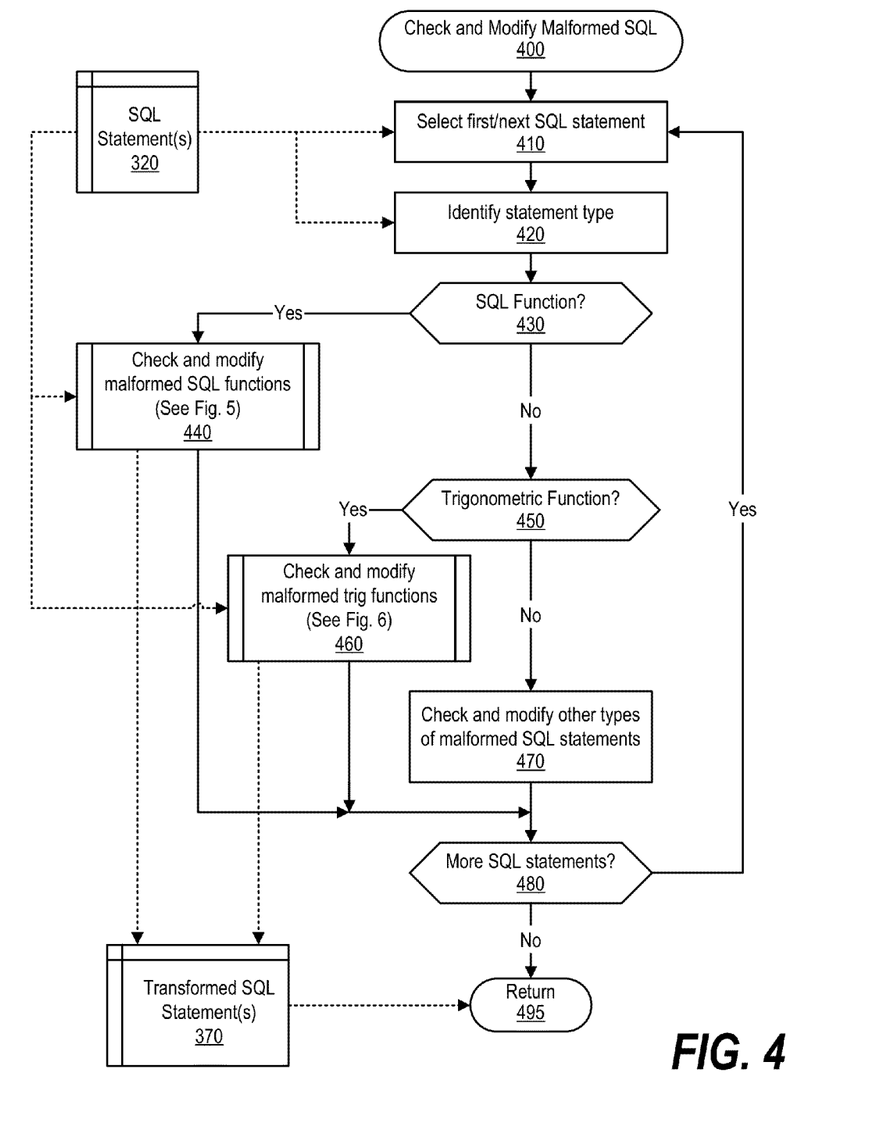
FIG. 4 is a depiction of a flowchart showing the high-level logic used to check and modify malformed SQL statements.

At predefined process 360, the database optimizer determines whether the SQL statement is "malformed" and, therefore, would be inefficiently processed by the database engine (see FIG. 4 and corresponding text for processing details). If an SQL statement is malformed, the SQL statement is modified to create an efficient SQL expression form that can be more efficiently processed by the database engine. As explained in further detail below, a malformed SQL statement is syntactically correct and would therefore pass the checks performed by SQL Syntax Checker function 330. However, due to its malformed structure, the SQL statement would be inefficiently processed by the database engine. Function 370 therefore transforms malformed SQL statements to an efficient SQL expression form and stores the efficient SQL expression in memory area 370.

For an example of a malformed SQL statement, assume that the requestor submits an SQL statement of:
SELECT GSCODE,SUM(TEK/1000),SUM((HNTIT+SISK)/1000)
FROM JCT T1
GROUP BY GSCODE.

The submitted SQL statement is an inefficient (malformed) SQL statement because it causes the database engine to perform a division by 1000 on every row value of the column called TEK and then to SUM of all those results. Likewise, the example in the above SQL statement adds two column values (HNTIT, SISK) and divides that total by 1000 and then sums that result for every row occurrence. So if the number of rows in table JCT is N then this SQL statement causes 2N divisions by 1000.

Because the submitted statement is "malformed" and inefficient, predefined process 360 would modify the statement to an efficient SQL expression form such as:
SELECT GSCODE,SUM(TEK)/1000,SUM((HNTIT+SISK))/1000
FROM JCT T1
GROUP BY GSCODE.

The efficient SQL expression form is more efficient because it causes only 1 division by 1000 (as opposed to N divisions by 1000) for the sum of all values of column TEK and likewise for the two column values that are added and divided by 1000. Thus, while the submitted SQL statement is syntactically correct, using the efficient SQL expression form causes the number of divisions to be reduced from 2N divisions to 2 divisions.

In another example, a requestor submits an SQL statement of:
SELECT (1−POWER(COS(:hostvar1),2)) FROM SYSIBM.SYSDUMMY1;

Again, while syntactically correct, this SQL statement is malformed and would be modified by predefined process 360 to an efficient SQL expression form of:
SELECT POWER(SIN(:hostvar1),2) FROM SYSIBM.SYSDUMMY1;

While both of the above expressions yield the same result, the efficient SQL expression form avoids an extra operation.

In a further example, a requestor submits an SQL statement of:
SELECT 2*(SIN(tostvar1)*COS(tostvar1)) FROM SYSIBM.SYSDUMMY1;

While syntactically correct, this SQL statement is malformed and would be modified by predefined process 360 to an efficient SQL expression form of:
SELECT SIN(2*(:hostvar1)) FROM SYSIBM.SYSDUMMY1;

In this example, while both of the above expressions yield the same result, but the second one avoids 2 extra operations. After the SQL statement has been checked for malformed expressions, the database engine optimizer builds a data access path (e.g., path, plan, etc.) utilizing the transformed efficient SQL expression (if function 360 modified a malformed SQL statement) or by utilizing the submitted SQL statement if the statement did not include a malformed expression. At step 390, the database engine executes the SQL statement (original SQL statement or as modified by function 360) against the database objects as set forth in the data access path built by function 380. Results from the executed SQL statement are then returned to the requestor (e.g., a recordset, a query result, resultant data, etc.).

FIG. 4 is a depiction of a flowchart showing the high-level logic used to check and modify malformed SQL statements. The process shown in FIG. 4 is an extra step in the optimization process that identifies and transforms malformed SQL statements. This extra step is an extension to and an extendable part of the relational database optimizer. The code to perform the enhanced optimization could be introduced in various stages to cover aggregate functions and then later scalar functions in part at first and more fully over time. The new optimization component incorporates numerical methods and mathematical principles into the SQL optimizer. In essence, numerical methods is a branch of mathematics that defines well established rules on performing calculations. When a calculation performed by a computer, such as in a database engine, its result has a finite precision which is dictated by the underflow and overflow characteristics of the computer. This in turn is a function of what sized word and how many words of storage the computer uses for various numerical data types.

For example, assume that a database program is programmed to add up N decimal numbers that range in value from $10^{-19}$ to $10^{19}$ and each of them is to be divided by another value (called the divisor) that is only known at program run time. There are essentially two ways to program the request: a) Take each number and divide it by the divisor, store the result, and finally add up all the results at the end, or, b) Add up all the numbers then divide the result by the divisor. In this example, the second approach is more efficient because it reduces N divisions to 1 and, if the divisor is very small (like $10^{-19}$) it would help avoid possible overflow situations when one of the values to be divided by the divisor is a very large number ($10^{19}$). By adding up all the numbers first, the effect of a very small value is lost when the division is done at the end as opposed to doing the division on each value. The same can be said for underflow situations if the values of the numbers are reversed, that is, if at some point a very small number is divided by a very large number.

The fact that often times the value of a given operand (in this case, the divisor) is not known until runtime, sometimes makes it difficult for the software to avoid possible overflow or underflow situations. These difficulties are addressed by incorporating numerical methods into the optimizer as described in FIG. 4 and in subsequent FIGS. 5 and 6. The approach shown in FIGS. 4-6 could be utilized in various SQL optimizations, as well as in situations where operations are performed on values stored in columns of relational database tables.

In FIG. 4, processing commences at 400 whereupon, at step 410, the optimizer selects the first SQL statement from memory area 320 with the SQL statement having been received from a requestor, such as a user or a procedure. At step 420, a statement type included in the selected SQL statement is identified by searching for known keywords (e.g., SQL function names, etc.). A decision is made as to whether the identified statement type is an SQL function (decision 430). If the statement type identified in the SQL statement is an SQL function, then decision 430 branches to the "yes" branch whereupon, at predefined process 440, a process is performed that checks and modifies malformed SQL functions (see FIG. 5 and corresponding text for processing details). As shown, if predefined process 440 modifies the selected SQL statement to form an efficient SQL expression form, the efficient SQL expression form is stored in memory area 370. As previously shown in FIG. 3, if transformation of a malformed SQL statement occurs, subsequent functions performed by the database engine utilize the efficient SQL expression form rather than the malformed SQL statement submitted by the requestor.

Returning to decision 430, if the statement type is not an SQL function, then decision 430 branches to the "no" branch whereupon another determination is made, in this case as to whether the statement type identified in the SQL statement is a trigonometric function (decision 450). If the statement type identified in the SQL statement is a trigonometric function, then decision 450 branches to the "yes" branch whereupon, at predefined process 460, a process is performed that checks and modifies malformed trigonometric functions (see FIG. 6 and corresponding text for processing details). Again, if predefined process 460 modifies the selected SQL statement to form an efficient SQL expression form, the efficient SQL expression form is stored in memory area 370 and this efficient SQL expression form will be utilized by subsequent functions performed by the database engine rather than the malformed SQL statement submitted by the requestor.

Returning to decision 450, if the identified statement type is neither an SQL function nor a trigonometric function, then decision 450 branches to the "no" branch whereupon, at step 470, other types of SQL statements can be checked and modified to more efficient statement types utilizing the techniques discussed herein. After the selected SQL statement has been processed, a decision is made as to whether there are additional SQL statements to process (decision 480). If there are more SQL statements to process, then decision 480 branches to the "yes" branch which loops back to select and process the next SQL statement as described above. This looping continues until there are no more SQL statements to process, at which point decision 480 branches to the "no" branch whereupon processing returns to the calling routine at 495.

Figure 5:
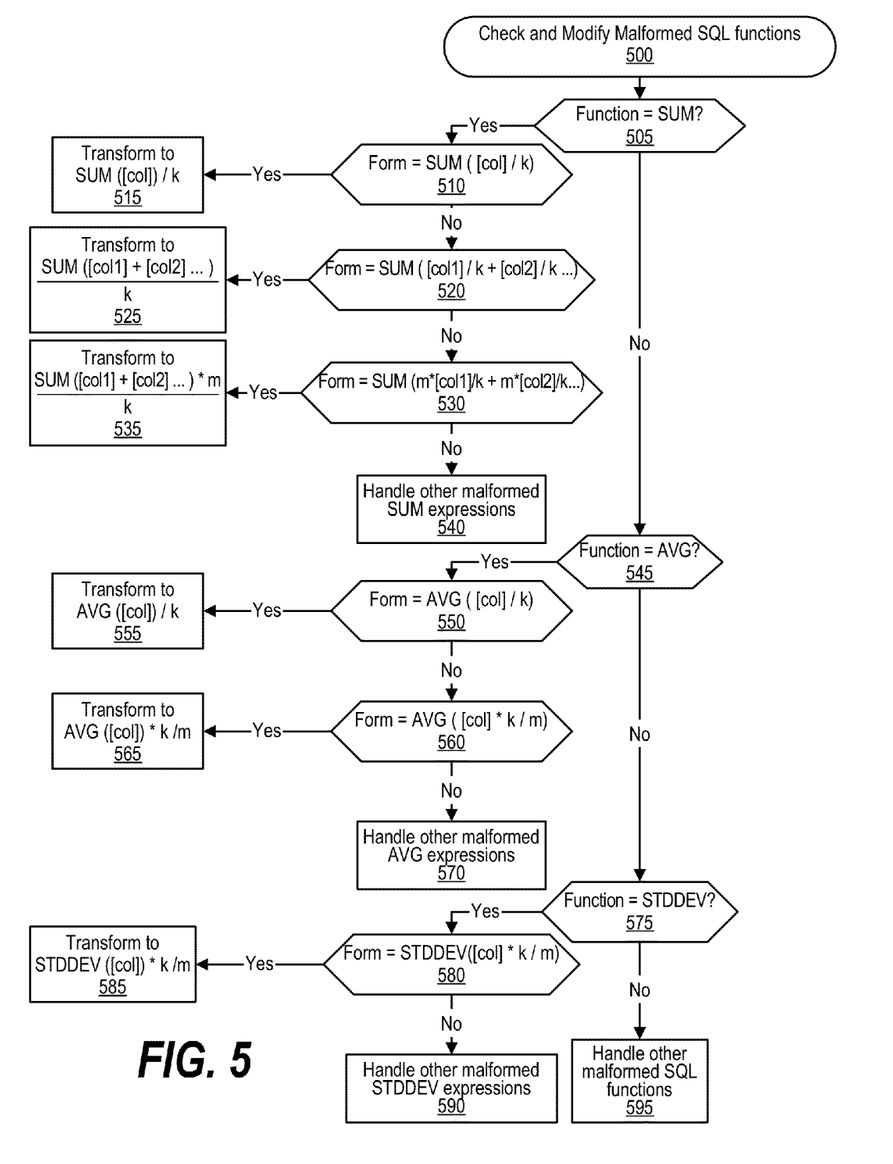
FIG. 5 is a depiction of a flowchart showing the logic used to check and modify malformed SQL functions.

FIG. 5 is a depiction of a flowchart showing the logic used to check and modify malformed SQL functions. Processing commences at 500 whereupon a decision is made as to whether the SQL function is a summation (SUM) function (decision 505).

If the function is a SUM function then decision 505 branches to the "yes" branch to process the SUM function. A decision is made as to whether parentheses in the SUM function are malformed with the form of the SUM function being SUM([col]/k) where [col] is a column name and k is a constant value (decision 510). If parentheses are malformed, then decision 510 branches to the "yes" branch whereupon, at step 515, the malformed expression found in the SQL statement is modified to an efficient SQL expression form, in this case SUM ([col])/k, which reduces the number of operations needed to be performed by the database engine. On the other hand, if parentheses in the SUM function are not malformed, then decision 510 branches to the "no" branch for further SUM function processing.

A decision is made as to whether distributed division is found in the SUM function with the form of the SUM function being SUM([col1]/k+[col2]/k+[col3]. . ./k . . . ) where [col1], [col2], and [col3], etc. are different column names and k is constant value (decision 520). If a distributed division form is identified, then decision 520 branches to the "yes" branch whereupon, at step 525, the malformed division expression found in the SQL statement is modified to SUM the columns and then divide the summation by the constant—SUM ([col1]+[col2]+[col3] . . . )/k, which reduces the number of operations needed to be performed by the database engine. On the other hand, if distributed division is not found in the SUM expression, then decision 520 branches to the "no" branch for further SUM function processing.

A decision is made as to whether a distributed hybrid operation is found in the SUM function with the form of the SUM function being SUM([col1]*m/k+[col2]*m/k+[col3]*m/k . . . ) where [col1], [col2], and [col3], etc. are different column names and k and m are constant values (decision 530). If a distributed multiplication form is identified, then decision 530 branches to the "yes" branch whereupon, at step 535, the malformed hybrid expression found in the SQL statement is modified to SUM the columns and then multiply the summation by the constant m/k—SUM ([col1]+[col2]+[col3])*m/k, which reduces the number of operations needed to be performed by the database engine. On the other hand, if distributed multiplication is not found in the SUM expression, then decision 530 branches to the "no" branch whereupon, at step 540 other malformed SUM expression types can be identified and modified using the approach described above. If the SUM expression is not found to be malformed, then the expression is not transformed (modified) by the process.

Returning to decision 505, if the function is not a SUM function, then decision 505 branches to the "no" branch for further checking. A decision is made as to whether the SQL statement includes an average (AVG) function (decision 545). If the SQL statement includes an AVG function, then decision 545 branches to the "yes" branch to check for any malformed expressions in the AVG function. A decision is made as to whether the AVG function has a misplaced parenthesis and is in the form AVG ([col]/k) (decision 550). If the AVG function is found to have a misplaced parenthesis, decision 550 branches to the "yes" branch whereupon, at step 555, the malformed expression is modified to an efficient SQL expression in the form AVG ([col])/k, thus reducing the number of operations needed to be performed by the database engine.

On the other hand, if a malformed expression of the form shown in decision 550 is not identified, then decision 550 branches to the "no" branch whereupon a malformed AVG expression in the form of AVG ([col]*k/m) is checked (decision 560). If such a malformed expression is found, then decision 560 branches to the "yes" branch whereupon, at step 565, the malformed expression is modified to an efficient SQL expression in the form of AVG ([col])*k/m. Those skilled in the art will appreciate that other mathematical operations other than multiplication (*) and division (/) can be in such a malformed expression and modified accordingly. If the AVG function is not in the form shown in decision 560, then decision 560 branches to the "no" branch whereupon, at step 570, other types of malformed AVG expressions can be identified and corrected using an approach similar to the approaches described above. If the AVG expression is not found to be malformed, then the expression is not transformed (modified) by the process.

Returning to decision 545, if the function is not a SUM or an AVG function, then decision 545 branches to the "no" branch for further checking. A decision is made as to whether the SQL statement includes a standard deviation (STDDEV) function (decision 575). If the SQL statement includes an STDDEV function, then decision 575 branches to the "yes" branch to check for any malformed expressions used with the STDDEV function. A decision is made as to whether the STDDEV function is in the form shown in decision 580 —STDDEV ([col]*k/m). If the STDDEV function is found to be in this form, then decision 580 branches to the "yes" branch whereupon, at step 585, the malformed expression is modified to an efficient SQL expression in the form STDDEV ([col])*k/m, thus reducing the number of operations needed to be performed by the database engine. If the STDDEV expression is not in the form shown in decision 580, then decision 580 branches to the "no" branch whereupon, at step 590, other types of malformed STDDEV expressions can be identified and corrected using an approach similar to the approaches described above. If the STDDEV expression is not found to be malformed, then the expression is not transformed (modified) by the process.

Returning to decision 575, if the function is not a SUM, an AVG, or a STDDEV function, then decision 575 branches to the "no" branch whereupon, at step 595, other malformed SQL functions are identified and modified using the approach and techniques described above. After the SQL function has been processed and, if necessary, modified to an efficient SQL expression form, then processing returns to the calling routine (see, e.g., FIG. 4).

Figure 6:
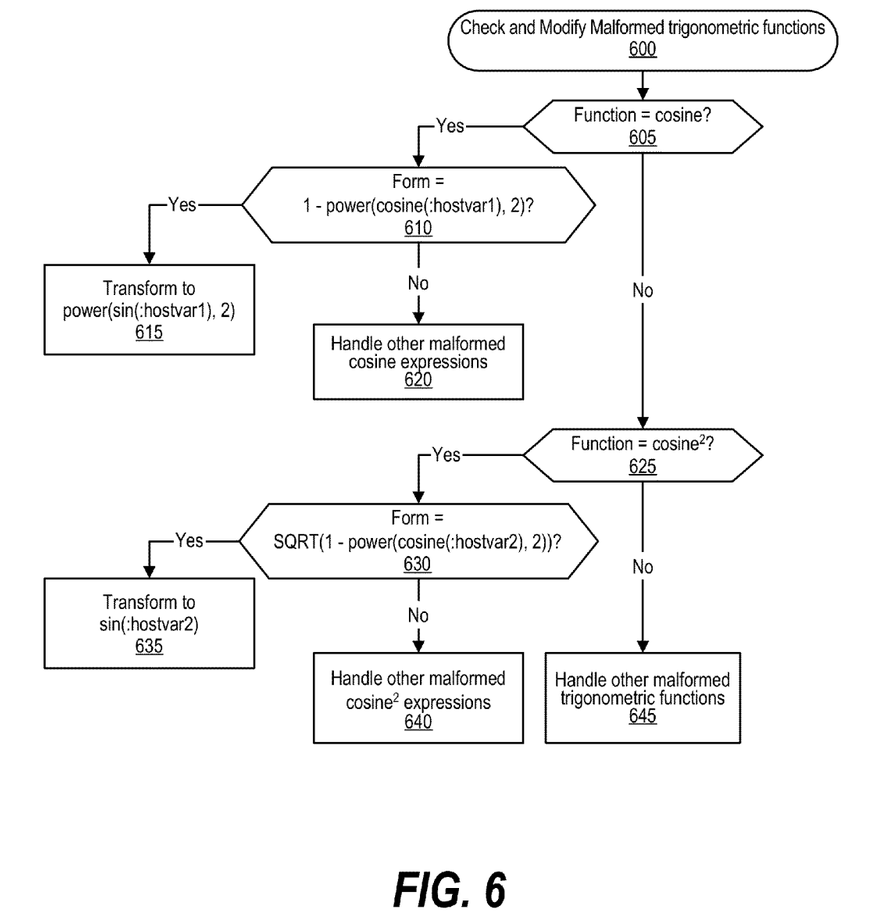
FIG. 6 is a depiction of a flowchart showing the logic used to check and modify malformed trigonometric functions.

FIG. 6 is a depiction of a flowchart showing the logic used to check and modify malformed trigonometric functions. Processing commences at 600 whereupon a decision is made as to whether the trigonometric function is a cosine function (decision 605). If the trigonometric function is a cosine function, then decision 605 branches to the "yes" branch whereupon a decision is made as to whether the cosine function is in the form shown in decision 610 [where the form is "1−power (cosine(:hostvar1), 2)", where hostvar1 is a host variable]. If such a form is found, then decision 610 branches to the "yes" branch whereupon, at step 615, the cosine function is modified to a sine function as shown [where the modified efficient SQL expression form is "power(sin(:hostvar1), 2)"]. On the other hand, if the form shown in decision 610 is not found, then decision 610 branches to the "no" branch whereupon, at step 620, other types of malformed cosine expressions can be identified and corrected using an approach similar to the approach described above. If the cosine expression is not found to be malformed, then the expression is not transformed (modified) by the process.

Returning to decision 605, if the function is not a cosine function then decision 605 branches to the "no" branch whereupon a decision is made as to whether the function is squared cosine function (cosine$^2$) at decision 625. If the function is a squared cosine function, then decision 625 branches to the "yes" branch whereupon decision is made as to whether the squared cosine function is in the form shown in decision 630 [where the form is "SQRT (1−power (cosine(:hostvar2, 2))", where hostvar2 is a host variable]. If such a form is found, then decision 630 branches to the "yes" branch whereupon, at step 635, the squared cosine function is modified to a sine function as shown [where the modified efficient SQL expression form is "sin(:hostvar2)"]. On the other hand, if the form shown in decision 630 is not found, then decision 630 branches to the "no" branch whereupon, at step 640, other types of malformed squared cosine expressions can be identified and corrected using an approach similar to the approach described above. If the squared cosine expression is not found to be malformed, then the expression is not transformed (modified) by the process.

Returning to decision 625, if the function is not a cosine or squared cosine function, then decision 625 branches to the "no" branch whereupon, at step 645, other malformed trigonometric functions are identified and modified using the approach and techniques described above. After the trigonometric function has been processed and, if necessary, modified to an efficient expression form, then processing returns to the calling routine (see, e.g., FIG. 4).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of modifying structured query language (SQL) statements, the method, implemented by an information handling system, comprising: receiving an SQL statement; comparing the received SQL statement to a plurality of predefined malformation rules, wherein at least one of the predefined malformation rules includes a syntactical pattern; determining that the received SQL statement includes a malformed expression, wherein the malformed expression is inefficiently handled by a database engine; and modifying the malformed expression to an efficient SQL expression form in response to the determination, wherein the modifying comprises:
retrieving one or more numerical methods and mathematical principles;
and applying the retrieved numerical methods and mathematical principles to the malformed expression to create the efficient SQL expression form.

2. The method of claim 1, wherein the modifying of the malformed expression further comprises: rearranging one or more terms that are arguments to a built-in SQL function.

3. The method of claim 2 wherein the built-in SQL function is selected from a group consisting of a summing (SUM) function, an averaging (AVG) function, and a standard deviation (STDDEV) function.

4. The method of claim 2 wherein the built-in SQL function is a trigonometric function.

5. The method of claim 1 further comprising:
performing the comparison prior to:
creating a database access path to one or more database objects referenced in the SQL statement in response to a determination that the SQL statement does not include any malformed SQL expression; and
executing the SQL statement against the database objects using the created database access path.

6. The method of claim 1 further comprising:
performing the modification prior to: creating a database access path to one or more database objects referenced in the efficient SQL expression form; and executing the efficient SQL expression form against the database objects using the created database access path.

7. An information handling system comprising:
one or more processors;
a memory coupled to at least one of the processors;
a database engine; and
a set of instructions stored in the memory and executed by at least one of the processors to modifying structured query language (SQL) statements, wherein the set of instructions perform actions of:
receiving an SQL statement; comparing the received SQL statement to a plurality of predefined malformation rules, wherein at least one of the predefined malformation rules includes a syntactical pattern;
determining that the received SQL statement includes a malformed expression, wherein the malformed expression is inefficiently handled by the database engine; and
modifying the malformed expression to an efficient SQL expression form in response to the determination, wherein the set of instructions that perform the modifying of the malformed expression further comprises additional instructions that perform additional actions comprising:
retrieving one or more numerical methods and mathematical principles; and
applying the retrieved numerical methods and mathematical principles to the malformed expression to create the efficient SQL expression form.

8. The information handling system of claim 7 wherein the set of instructions that perform the modifying of the malformed expression further comprises additional instructions that perform additional actions comprising: rearranging one or more terms that are arguments to a built-in SQL function.

9. The information handling system of claim 8 wherein the built-in SQL function is selected from a group consisting of a SUM summing (SUM) function, an averaging (AVG) function, and a standard deviation (STDDEV) function.

10. The information handling system of claim 8 wherein the built-in SQL function is a trigonometric function.

11. The information handling system of claim 7 wherein the set of instructions performs additional actions comprising: performing the comparison prior to: creating a database access path to one or more database objects referenced in the SQL statement in response to a determination that the SQL statement does not include any malformed SQL expression; and executing the SQL statement against the database objects using the created database access path.

12. The information handling system of claim 7 wherein the set of instructions performs additional actions comprising: performing the modification prior to: creating a database access path to one or more database objects referenced in the efficient SQL expression form; and executing the efficient SQL expression form against the database objects using the created database access path.

13. A computer program product stored in a computer readable storage device, comprising computer instructions that, when executed by an information handling system, causes the information handling system to modifying structured query language (SQL) statements by performing actions comprising:
receiving an SQL statement; comparing the received SQL statement to a plurality of predefined malformation rules, wherein at least one of the predefined malformation rules includes a syntactical pattern;
determining that the received SQL statement includes a malformed expression, wherein the malformed expression is inefficiently handled by a database engine; and
modifying the malformed expression to an efficient SQL expression form in response to the determination, wherein the modifying of the malformed expression includes further actions comprising:
retrieving one or more numerical computer program products and mathematical principles; and
applying the retrieved numerical computer program products and mathematical principles to the malformed expression to create the efficient SQL expression form.

14. The computer program product of claim 13, wherein the modifying of the malformed expression: rearranging one or more terms that are arguments to a built-in SQL function.

15. The computer program product of claim 14 wherein the built-in SQL function is selected from a group consisting of a summing (SUM) function, an averaging (AVG) function, and a standard deviation (STDDEV) function.

16. The computer program product of claim 14 wherein the built-in SQL function is a trigonometric function.

17. The computer program product of claim 13 wherein the actions further comprise:
performing the comparison prior to:
creating a database access path to one or more database objects referenced in the SQL statement in response to a determination that the SQL statement does not include any malformed SQL expression; and
executing the SQL statement against the database objects using the created database access path.

18. The computer program product of claim 13 wherein the actions further comprise: performing the modification prior to: creating a database access path to one or more database objects referenced in the efficient SQL expression form; and executing the efficient SQL expression form against the database objects using the created database access path.

19. A method, implemented by an information handling system, comprising:
receiving a structured query language (SQL) statement from a requestor; checking a syntax of the received SQL statement;
validating a plurality of database objects referenced in the SQL statement;
verifying an authorization of the requestor to access the plurality of database objects;
comparing the received SQL statement to a plurality of predefined malformation rules, wherein at least one of the predefined malformation rules includes a syntactical pattern;
determining that the received SQL statement includes a malformed expression, wherein the malformed expression is inefficiently handled by a database engine;
modifying the malformed expression to an efficient SQL expression form in response to the determination, wherein the efficient SQL expression is used as the SQL statement, wherein the modifying comprises:
retrieving one or more numerical methods and mathematical principles; and
applying the retrieved numerical methods and mathematical principles to the malformed expression to create the efficient SQL expression form;
creating a data access path to the plurality of database objects; and executing the SQL statement by the database engine that utilizes utilizing the created data access path.

20. The method of claim 19, wherein the modifying of the malformed expression further comprises:
rearranging one or more terms that are arguments to a built-in SQL function.

* * * * *